United States Patent [19]

Edmondson

[11] 4,121,033

[45] * Oct. 17, 1978

[54] CHLOROPRENE-SULFUR POLYMERIZATION WITH DI(O-ALKYLTHIONOTHIOLCARBONOXY)-SULFIDES

[75] Inventor: Morris S. Edmondson, Alvin, Tex.

[73] Assignee: Denka Chemical Corporation, Houston, Tex.

[*] Notice: The portion of the term of this patent subsequent to Dec. 2, 1992, has been disclaimed.

[21] Appl. No.: 739,635

[22] Filed: Nov. 8, 1976

[51] Int. Cl.$^2$ .......................... C08F 2/26; C08F 2/24; C08F 36/18

[52] U.S. Cl. .................................. 526/223; 526/220; 526/295

[58] Field of Search .................... 526/222, 223, 295

[56] References Cited

U.S. PATENT DOCUMENTS

| | | | |
|---|---|---|---|
| 2,234,204 | 3/1941 | Starkweather | 526/223 X |
| 2,234,215 | 3/1941 | Youker | 260/79.5 R |
| 2,264,173 | 11/1941 | Collins | 526/223 X |
| 2,430,562 | 11/1947 | Fryling | 526/220 X |
| 3,472,828 | 10/1969 | Montgomery | 526/223 X |
| 3,651,038 | 3/1972 | Snow, Jr. | 526/295 X |
| 3,923,763 | 12/1975 | Edmondson | 526/222 X |

Primary Examiner—Christopher A. Henderson, Jr.
Attorney, Agent, or Firm—Kenneth H. Johnson

[57] ABSTRACT

Chloroprene-sulfur copolymers having improved storage stability are produced by carrying out the emulsion polymerization in the presence of organic polysulfide compounds of the formula.

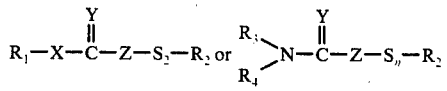

where X, Y and Z are selected from the group consisting of oxygen and sulfur, $R_1$ is a hydrocarbon radical having from 1 to 8 carbon atoms, $R_2$ is a hydrocarbon radical having from 1 to 8 carbon atoms or is a radical the same as

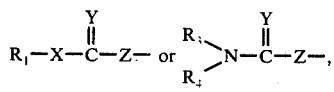

$R_3$ and $R_4$ are selected from the group consisting of hydrocarbon radicals having from 1 to 8 carbon atoms or hydrogen with at least one $R_3$ and $R_4$ not being hydrogen and $n$ is 1 to 4.

5 Claims, No Drawings

CHLOROPRENE-SULFUR POLYMERIZATION WITH DI(O-ALKYLTHIONOTHIOLCARBONOXY)SULFIDES

RELATED U.S. APPLICATION DATA

This application is related to Ser. No. 541,237 filed Jan. 15, 1975, now U.S. Pat. No. 3,923,763 granted Dec. 2, 1975, which was a continuation-in-part of Ser. No. 289,521 filed Sept. 15, 1972, now abandoned.

The present invention relates to polychloroprene comprising chloroprene and sulfur as comonomers which have improved stability.

Polymers of chloroprene which are modified with elemental sulfur has been found to be useful and versatile compositions. However, when sulfur is incorporated into polychloroprene during the polymerization the sulfur actually becomes a comonomer with the chloroprene in the polymer chain. The copolymer which results directly from the polymerization of sulfur and chloroprene is intractable and is totally unsuited for use on standard rubber processing equipment.

The solution in the past has generally been to plasticize the chloroprene-sulfur copolymer. Plasticizing is also known as "peptizing" and such agents and processes are well known as illustrated for example in U.S. Pat. No. 2,234,215 to Youker issued Mar. 11, 1941. The most widely used peptizing agent of the class taught by Youker has been tetraethylthiuram disulfide and it is generally representative of the broad class of peptizing agents.

The plasticizing is achieved by cleaving the sulfur-sulfur linkages present in the copolymer. The plasticized polymers thus produced were quite useful, with the notable exception that they were extremely unstable in storage and the viscosity changed substantially during storage, frequently resulting in unuseable polymers. Refrigeration provides a means to slow the deterioration of the polymer, but even with refrigeration the useful life of peptized chloroprene-sulfur copolymers is rather limited.

It has been known to polymerize chloroprene in the presence of sulfur compounds as polymerization modifiers. Mercaptan compounds have been extensively employed as polymerization modifiers. Early patents for the polymerization of hydrocarbon derivatives and copolymers such as the polymerization of butadiene with styrene suggested that sulfur compounds could be employed with the invention being that a combination of a mercaptan and a xanthogen compound is used. For example U.S. Pat. Nos. 2,401,346 and 2,416,440 have examples of the polymerization of butadiene-1,3 and styrene with bis-(isopropyl xanthogen) and cetyl mercaptan and bis(isopropoxythiono) cyano monosulfide with a mixture of mercaptans of about 18 carbon atoms. Chloroprene has been polymerized with dialkyl xanthogen disulfide compounds as modifiers as is illustrated by U.S. Pat. Nos. 2,321,693; 2,567,117; 3,190,865; 3,300,433; 3,317,451; 3,392,134; 3,397,173; 3,444,152; 3,472,828; 3,507,825 and 3,655,827 and British Pat. Nos. 858,444; 905,971 and 952,156.

In U.S. Pat. No. 3,397,173 Collette et al. disclosed that dialkyl xanthogen disulfide used as a modifier in conjunction with chloroprene and sulfur in the polymerization, produced copolymers which were processable as produced and hence, did not require plasticizing, thereby avoiding the use of the peptizing agents of the prior art and the copolymers exhibited very good stability. This was surprising in view of the prior art teachings, as shown in U.S. Pat. No. 2,234,215, that the presence of a variety of compounds such as mercaptans, dixanthogens, bisthioxanthogens and aromatic polysulfides resulted in plasticized but unstable copolymers. This result is understandable if the Youker patent is considered for what it shows, i.e., the use of all of the various and assundry compounds disclosed therein as peptizing agents. Hence, the only manner taught or contemplated of employing the compounds disclosed by Youker, was the addition thereof to the polychloroprene-sulfur copolymer.

The present invention does not relate to peptization, but discloses a class of modifiers which are included with the reactants and present during the polymerization which result directly in polymers which are processable without peptization and which are stable.

SUMMARY OF THE INVENTION

According to this invention chloroprene is polymerized in the presence of elemental sulfur and compounds of the formula

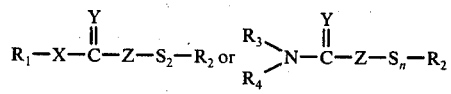

where X, Y and Z are selected from the group consisting of oxygen and sulfur, $R_1$ is a hydrocarbon radical having from 1 to 8 carbon atoms, $R_2$ is a hydrocarbon radical having from 1 to 8 carbon atoms or is a radical the same as

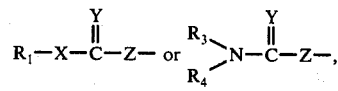

$R_3$ and $R_4$ are selected from the group consisting of hydrocarbon radicals having from 1 to 8 carbon atoms or hydrogen with at least one of $R_3$ and $R_4$ not being hydrogen and $n$ is 1 to 4. Compounds of this type may be formed, e.g., as disclosed in Twiss, W. D.JACS 49, February 1927,p. 491-4. For convenience these compounds will be referred to as the sulfide modifiers in this application. The products are modified chloroprene-sulfur copolymers.

DETAILED DESCRIPTION OF THE INVENTION

According to this invention chloroprene, 2-chloro-1,3 butadiene, and sulfur, are polymerized using the sulfide modifiers as a polymerization modifier. The term "polymers of chloroprene" or "chloroprene-sulfur copolymers" encompasses polymers in which chloroprene is the major or predominant monomer. Comonomers may also be employed such as 2,3-dichloro-1, 3-butadiene; acrylonitrile, methyl methacrylate and so forth. Usually, the total amount of comonomers will represent no greater than 25 mol percent of the total monomers and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization and recovery of chloroprene are disclosed, for example, in Encyclopedia of Polymer Science and Technology, Vol. 3, page 705–730 (Interscience, 1965) and in numerous patents such as U.S. Pat. Nos. 2,264,173 and 2,264,191 both issued on Nov. 25, 1941. The polymerization may be conducted either batch or continuously.

Conventional emulsifiers may be employed such as the salts of rosins and rosin derivatives such as tall oil rosin (or resin), wood rosin, disporportionated rosin or hydrogenated rosin; ammonium, sodium or potassium salts of long chain fatty acids; nonionic surface active agents such as the ethylene oxide or propylene oxide condensation products of compounds containing reactive hydrogen atoms. Additional emulsifying agents are disclosed in U.S. Pat. No. 2,264,173. In this specification rosin or rosinates include the various commercial rosins, the dehydrogenated rosins and disproportionated rosins and salts thereof. Rosin base emulsifiers are well known to the art. A particularly preferred rosin emulsifier is wood rosin (unmodified except for clean-up and sold by the Reichhold Chemicals, Inc. as Nancy-Wood Rosin).

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-axo-bis-isobutyronitrile and the like. Suitable inorganic peroxides are such as inorganic per acids including persulfates, perborates or percarbonates, e.g., ammonium or potassium persulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight on the total weight of the composition.

The sulfide modifier may be fed during polymerization. The only requirement is that the sulfide modifier be present for polymerization modification. However, it is usually preferred to add at least the predominant portion of the sulfide modifier to the initial polymerization charge. Although the amount of sulfide modifier is not critical certain proportions have been discovered to give superior results and within the range of from about 0.05 to 5 parts by weight of the sulfide modifier per 100 parts of polymerizable monomers are usually employed with a preferred range being from about 0.2 to 1.5 parts per 100 parts of monomer.

The polymerization is carried out in the presence of elemental sulfur to produce a chloroprene-sulfur copolymer. The benefits of the present invention are obtained in the chloroprene-sulfur copolymers by a process which comprises polymerizing chloroprene in aqueous emulsion in the presence of from 0.2 to 0.6 parts of sulfur, per 100 parts of monomer, preferably 0.25 to 0.45 parts thereof and sulfide modifier as described above.

Other modifiers or other agents may be present in the emulsion. For instance, chain transfer agents may be employed such as the alkyl mercaptans, e.g., dodecyl mercaptan, iodoform and benzyl iodide. However, compounds which will interfere with the proper functioning of the sulfide modifier should be avoided and thus the modifier may consist essentially of the sulfide modifiers of this invention. At any rate preferably the modifiers will be predominantly by weight the sulfide modifier compounds of this invention.

Preferably, the polymerization would be conducted in an oxygen free or substantially oxygen free atmosphere such as in an inert gas. However, in some polymerization processes, as known in the prior art, a controlled amount of oxygen may be employed and the present sulfide modifiers may be used there with benefit.

The degree of polymerization and characteristics of the polymer can be controlled as is known in the art. The production of either benzene soluble or benzene insoluble polymers is within the scope of this invention. Suitable ranges for the percent of monomer conversion are such as between 60 and 95 percent conversion. The products can be employed to produce easy processing blends such as disclosed in U.S. Pat. No. 3,655,827 with the modifiers of this invention being used in preparation of either the sol or gel polymers or both but preferably in the preparation of the sol portion of the blend. If the sols are so modified with the sulfide modifiers a preferred range of modifier is from 0.10 to 3 weight parts per 100 parts of total monomer.

The temperature of polymerization may be varied depending upon the particular type of polymer being employed with suitable ranges being from 0° C. to 90° C. with the preferred range being between 15° C. and 55° C. The polymerization may be short stopped by the addition of agents such as paratertiary-butyl catechol and thiodiphenylamine. The process of polymerization may be either continuous or may be conducted in batch.

Examples of compounds which are useful as modifier according to this invention are di(O-ethyl thionothiolcarbonoxy) sulfide, di(O-ethyl thionothiolcarbonoxy) disulfide, isopropyl O-ethyl thionothiolcarbonoxy disulfide and so forth. In the compounds of the formula

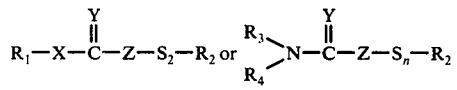

$R_1$ is a hydrocarbon radical of from 1 to 8 carbon atoms and $R_2$, $R_3$ and $R_4$ can be hydrocarbon radicals of from 1 to 8 carbon atoms or as defined above. The hydrocarbon radicals can be acyclic, cycloaliphatic, aromatic or combinations thereof. For example, the radicals can be methyl, ethyl, n-propyl, isopropyl, n-butyl, isobutyl, n-pentyl, 2-ethyl hexyl, cycloaliphatic radicals having 5 to 6 carbons, aryl radicals such as phenyl, alkaryl radicals such as methylphenyl, combinations thereof and so forth.

The polychloroprenes produced utilizing the modifiers of this invention can be cured and compounded by a variety of agents and means. The processing and compounding of polychloroprenes is discussed in the Encyclopedia of Polymer Science and Technology, Vol. 3, p. 724–730 (Interscience 1965) and J. C. Carl, Neoprene Latex, 1962, which references are incorporated by reference. Accelerators may be such as thioureas, amines, guanidine, thiazole, thiuram sulfides, thiocarbonates, organic acids, sulfur and the like.

The addition of an antioxidant to the compositions of the present invention may be desirable to obtain optimum stability, although it is not necessary to do so. Suitable antioxidants include secondary aromatic amines and phenolic materials generally known as antioxidants such as N-phenyl-1-naphthylamine, N-phenyl-2-naphthylamine, N,N'-diphenyl-p-phenylenediamine, alkylated diphenylamines, such as octylated or nonylated diphenylamines, p-isopropoxydiphenylamine, di-2-naphthyl-p-phenylenediamine, N-phenyl-N'-(p-toluenesulfonyl)-p-phenylenediamine, 2,2'-methylene-bis (6-tert-butyl-p-cresol), 2,2'-methylene-bis-(4-methyl-6-t-butyl phenol), 2,2'-methylenebis (6-tert-4-ethylphenol), 4,4'-butylidenebis (6-tert-butyl-p-cresol), 2,2'-methylenebis [(6-(1-methylcyclohexyl))-p-cresol], 2,6-di-tert-butyl-4-phenylphenol, 4,4'-thiobis (6-tert-butyl-m-cresol), 4,4'-thiobis (3,6-di-sec-amylphenol), 2,2'-thiobis (6-tert-butyl-p-cresol), 2,2'-thiobis (4,6-di-tert-butylphenol), 2,5-di-tert-amylhydroquinone, 4-benzyloxyphenol, 2,6-di-tert-butyl-α-dimethylamino-p-cresol, 2,4,6-tris (3,5-di-tert-butyl-4-hydroxybenzy) mesitylene and 2,4,6-tris(dimethylaminomethyl)phenol.

It has been discovered that chloroprene-sulfur copolymers produced with the modifiers of this invention have excellent properties including high tensile strength and modulus properties. The copolymers also have excellent aging stability and can exhibit excellent characteristics as measured by die swell, easy processing, controllable Mooney Viscosities, cure rate, elongation, crystallization rate, oil resistance and the like. The copolymers can be used for a variety of applications either as a latex or as a recovered polymer including such applications as for dipped goods, adhesives, coatings, non-woven fabrics, bonded fibers, treated paper, sealants, foam, thread, carpet backing, hoses, gaskets, elasticized concrete and other known uses of polychloroprenes.

The sulfide compounds of the examples are only illustrative of the invention. The R groups of the structural formulas listed in the specification may be substituted with non-hydrocarbon radicals which do not interfere with the modification process. For example, in some instances radicals such as halogen, hydroxyl and-/or nitrate groups may be present. However, the hydrocarbon compounds are preferred. Also preferred are the compounds of the formula

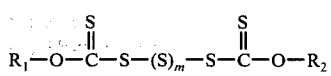

wherein $m$ is 1 to 4, $R_1$ and $R_2$ are independently selected hydrocarbon radicals having 1 to 8 carbon atoms, particularly preferred compounds are those of the formula

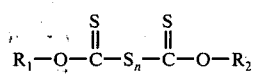

wherein $n$ is 3 or 4, $R_1$ and $R_2$ are hydrocarbon radicals, but the two R groups do not necessarily have to be the same. Particularly preferred are compounds where R is isopropyl such as di(O-isopropyl dithiocarbonoxy) - sulfide.

In the Examples all parts are by weight unless expressed otherwise. These examples are only illustrative of the invention.

EXAMPLE 1

The polymerizations are run in a 5 liter glass autoclave equipped with a paddle agitator. The charge is based on 100 parts of chloroprene which is 2000 grams.

| COMPONENTS | PARTS BY WEIGHT |
|---|---|
| Chloroprene | 100 |
| N-Wood Rosin | 4.0 |
| Sulfur | 0.35 |
| Modifier | (given in Table I) |
| Butylated Hydroxy Toluene | 0.10 |
| Water | 150 |
| Sodium Hydroxide | 0.734 |
| Sodium salt of condensate of formaldehyde and naphthalene sulfonic acid | 0.75 |
| CATALYST SOLUTION | |
| Water | 95.4 ⎫ |
| Potassium Persulfate | 4.5 ⎬ Percent |
| Sodium Anthroquinone β-sulfonate | 0.115 ⎭ Mix |
| CONVERSION | 84% |

The polymerization is carried out at 45° C. with initiation and maintenance of polymerization by adding the catalyst solution in small increments while maintaining a nitrogen atmosphere during the reaction. When the desired level of conversion is reached the polymerization is stopped by adding a solution of 4-tert-butylcatechol and phenothiazine. The latex is steam stripped of unreacted monomer and the resulting latex mixture is acidified to a pH of 6.3 using a 10 percent acetic acid solution and isolated by freeze roll techniques. When desired, additional antioxidant was introduced in a chloroprene emulsion to the latex before steam stripping.

All polymers were evaluated by measuring the Mooney viscosity of the freshly isolated polymers and of samples which have been stored at 40° C. up to a period of 3 months (see Table I).

It can be seen that the viscosity of the prior art "sulfur-modified" polymer (V) drops rapidly to an unacceptable value and would be very difficult to handle, whereas the other polymers prepared utilizing the novel sulfide modifiers, do not exhibit this drop in viscosity but show a slow increase during storage. The samples containing antioxidants (either phenolic or amine type) show the smallest increase in viscosity during storage.

TABLE I

| Sample | Antioxidant | Modifier[1] Type Phm | Original | Mooney Viscosity[2] ML1+2½/ML1+4 | | |
|---|---|---|---|---|---|---|
| | | | | 1 week | 3 weeks | 3 mos. |
| I | None | A(0.56) | 55.5/50 | 57/56 | 57.5/56.5 | 68/74 |
| II | (3) | A(0.58) | 64.5/59.5 | 66/64 | 68/67.5 | 70.76 |
| III | (4) | A(0.56) | 61/56 | 60.5/60 | 62.5/62.5 | 67/73 |
| IV | (3) | B(0.55) | 63 | 61/59 | 61/60.5 | 66/70 |
| V[3] | (5) | — | 55 | 40/36.5 | 33/30.5 | 27/25.2 |

[1]modifiers:
A)Di-(O-Isopropyl Dithiocarbonoxy)-sulfide
B)Di-(O-Isopropyl Dithiocarbonoxy)-disulfide
[2]samples aged at 40° C
(3) 0.5 phr of A.O. 2246[2.2'-methylene-bis-(4-methyl-6-t-butyl phenol)]
(4) 0.5 phr of N-phenyl-α-naphthylamine
(5) 0.05 phm of A.O. 2246 added with shortstop
[3]Sample V is a commercial chloroprene-sulfur copolymer formulation designated as S-5, sold by Petro-Tex Chemical Corporation produced by polymerizing chloroprene and sulfur up to 84% conversion and peptizing the copolymer product with tetraethyl thiuram disulfide for about 5 hours at 40° C and cooled to less than 20° C. (generally as taught by Youker in U.S. Pat. No. 2,234,215).

EXAMPLE 2

The vulcanizates prepared from the present novel chloroprene-sulfur copolymers also exhibit improved properties. Compounds were evaluated in a black stock as follows:

| Components | Parts by Weight |
|---|---|
| Polymer | 100.0 |
| TETDS | 1.5 |
| Diphenylguanidine | 0.25 |
| Magnesia | 4.0 |
| Stearic Acid | 0.5 |
| MT Black | 100.0 |
| Light Process Oil | 10.0 |
| Zinc Oxide | 5.0 |
| Ethylene Thiourea | 0.25 |

All mixing was carried out on a cold roll mill.

The vulcanizates were tested and the results are reported in Table II.

TABLE II

| Sample | Antioxidant | Modifier[1] phm | Modulus 100 % | Modulus 300 % | Tensile psi | % Elongation | Compound Viscosity |
|---|---|---|---|---|---|---|---|
| I | None | A(0.56) | 375 | 1650 | 1945 | 430 | 41/40 |
| II | ([2]) | A(0.58) | 350 | 1620 | 1970 | 435 | 42/41 |
| III | ([3]) | A(0.56) | 350 | 1560 | 1945 | 455 | 44.5/44 |
| IV | ([2]) | B(0.55) | 380 | 1680 | 1995 | 430 | 41.5/40.5 |
| V | ([4]) | — | 400 | 1680 | 1920 | 440 | 43/42.5 |

[1]modifiers (level phm)
A) Di-(Isopropyl Dithiocarbonoxy)-sulfide
B) Di-(Isopropyl Dithiocarbonoxy)-disulfide
[2]0.5 phr of A.O. 2246
[3]0.5 phr of N-phenyl-α-naphthylamine
[4]0.05 phr of A.O. 2246 added with shortstop.

The chloroprene-sulfur copolymers of the present invention are adequately plastized without peptization, however, if lower Mooney viscosity rubber is desired they may be peptized. Peptizing agents include those of the prior art such as TETDS and also the compositions which are the modifiers of the present invention, in particular, the compounds of the formula $$R_1-O-\overset{S}{\underset{\parallel}{C}}-S-(S)_m-S-\overset{S}{\underset{\parallel}{C}}-O-R_2$$

wherein $m$ is 1 to 4, $R_1$ and $R_2$ are independently selected hydrocarbon radicals having 1 to 8 carbon atoms, and compounds of the formula $$R_1-O-\overset{S}{\underset{\parallel}{C}}-S_n-\overset{S}{\underset{\parallel}{C}}-O-R_2$$

wherein $n$ is 3 or 4, $R_1$ and $R_2$ are hydrocarbon radicals, (but the two R groups do not necessarily have to be the same). Particularly preferred are compounds where R is isopropyl such as di-(O-isopropyl dithiocarbonoxy)-sulfide.

The following examples illustrate this. The polychloroprene was produced by the recipe given in Example 1. The results are reported below in TABLE III:

TABLE III

| Sample | Antioxidant | Modifier[1] phm | Peptizing Agent phr[1] A | Peptizing Agent phr[1] B | Peptizing Agent phr[1] C | Mooney Viscosity after Working on Mill for 5 min | Mooney Viscosity after Working on Mill for 10 min |
|---|---|---|---|---|---|---|---|
| VI | ([2]) | A(.58) | — | — | — | 36/34 | 32/29.5 |
| " | " | " | 1.5 | — | — | 33/30.5 | 27/24.5 |
| " | " | " | — | 1.5 | — | 32.5/29.5 | 27/25 |
| " | " | " | — | — | 1.5 | 36.5/34 | 29.5/27 |
| VII | ([2]) | B(.55) | — | — | — | 38.5/35 | 30/28 |
| " | " | " | 1.5 | — | — | 31.5/29 | 28/26 |
| " | " | " | — | 1.5 | — | 33/30 | 27/25 |
| " | " | " | — | — | 1.5 | 34/31.5 | 27.5/25.5 |

[1]modifiers and/or peptizing agents
A) Di-(O-Isopropyl Dithiocarbonoxy)-sulfide
B) Di-(O-Isopropyl Dithiocarbonoxy)-disulfide
C) Tetraethyl thiuram disulfide (TETDS)
[2]0.5 phr of A.O. 2246.

The invention claimed is:

1. A process for the emulsion polymerization of chloroprene and sulfur for the preparation of chloroprene-sulfur copolymers having improved viscosity stability which comprises polymerizing chloroprene and 0.2 to 0.6 parts by weight of elemental sulfur per 100 parts of polymerizable monomer in the presence of 0.05 to 5.0 parts by weight per 100 parts of monomer of a modifier having the formula $$R_1-O-\overset{S}{\underset{\parallel}{C}}-S-(S)_m-S-\overset{S}{\underset{\parallel}{C}}-O-R_2$$

wherein $R_1$ is a hydrocarbon radical having from 1 to 8 carbon atoms, $R_2$ is a hydrocarbon radical having from 1 to 8 carbon atoms and $m$ is 1 to 4.

2. A process for the emulsion polymerization of chloroprene and sulfur for the preparation of chloroprene-sulfur copolymers having improved viscosity stability which comprises polymerizing chloroprene and 0.2 to 0.6 parts by weight of elemental sulfur per 100 parts of polymerizable monomer in the presence of 0.05 to 5.0 parts by weight per 100 parts of monomer of a modifier having the formula $$R_1-O-\overset{S}{\underset{\parallel}{C}}-S_n-\overset{S}{\underset{\parallel}{C}}-O-R_2$$

wherein $R_1$ is a hydrocarbon radical having 1 to 8 carbon atoms, $R_2$ is a hydrocarbon radical having 1 to 8 carbon atoms and $n$ is 3 to 4.

3. The process according to claim 1 wherein from 0.25 to 0.45 parts by weight elemental sulfur and 0.2 to 1.5 parts by weight sulfide compounds are present.

4. The process of claim 2 wherein the said modifier is of the formula $$CH_3-\underset{\underset{H}{|}}{\overset{\overset{CH_3}{|}}{C}}-O-\overset{S}{\underset{\parallel}{C}}-S_n-\overset{S}{\underset{\parallel}{C}}-O-\underset{\underset{H}{|}}{\overset{\overset{CH_3}{|}}{C}}-CH_3$$

5. The process of claim 1 wherein the said modifier is of the formula $$R_1-O-\overset{S}{\underset{\parallel}{C}}-S_3-\overset{S}{\underset{\parallel}{C}}-O-R_2.$$

* * * * *

UNITED STATES PATENT OFFICE
CERTIFICATE OF CORRECTION

PATENT NO. : 4,121,033
DATED : October 17, 1978
INVENTOR(S) : Morris S. Edmondson It is certified that error appears in the above-identified patent and that said Letters Patent are hereby corrected as shown below:

Abstract, 1st Formula reads "$R_1 - X - \overset{\overset{Y}{\|}}{C} - Z - S_2 - R_2$" but should read -- $R_1 - X - \overset{\overset{Y}{\|}}{C} - Z - S_n - R_2$ --

Column 2, line 27 1st Formula reads "$R_1 - X - \overset{\overset{Y}{\|}}{C} - Z - S_2 - R_2$" but should read -- $R_1 - X - \overset{\overset{Y}{\|}}{C} - Z - S_n - R_2$ --

Column 3, line 32 reads "-axo-" but should read -- -azo- --

Column 4, line 48 reads "$R_1 - X - \overset{\overset{Y}{\|}}{C} - Z - S_2 - R_2$" but should read -- $R_1 - X - \overset{\overset{Y}{\|}}{C} - Z - S_n - R_2$ --

Signed and Sealed this

Eighteenth Day of March 1980

[SEAL]

Attest:

SIDNEY A. DIAMOND

Attesting Officer    Commissioner of Patents and Trademarks